United States Patent [19]
Morley et al.

[11] Patent Number: 5,796,989
[45] Date of Patent: Aug. 18, 1998

[54] METHOD AND SYSTEM FOR INCREASING CACHE EFFICIENCY DURING EMULATION THROUGH OPERATION CODE ORGANIZATION

[75] Inventors: John E. Morley, Kapaa, Hi.; Mark I. Himelstein, Saratoga, Calif.

[73] Assignee: Apple Computer, Inc., Cupertino, Calif.

[21] Appl. No.: 904,458

[22] Filed: Aug. 1, 1997

Related U.S. Application Data

[63] Continuation of Ser. No. 406,434, Mar. 20, 1995, abandoned.
[51] Int. Cl.⁶ .................................................. G06F 12/10
[52] U.S. Cl. .......................... 395/500; 711/202; 711/206; 711/3
[58] Field of Search ................................. 395/500, 701, 395/702, 704, 705, 680, 703, 707; 711/202, 3, 206

[56] References Cited

U.S. PATENT DOCUMENTS

| | | | |
|---|---|---|---|
| 5,303,377 | 4/1994 | Gupta et al. | 395/700 |
| 5,392,408 | 2/1995 | Fitch | 395/375 |

OTHER PUBLICATIONS

McFarling, Scott, "Procedure Merging with Instruction Caches", *Proceedings of the ACM SIGPLAN '91 Conference on Programming Language Design and Implementation*, Jun. 26-28, 1991, pp. 71-79.

*Primary Examiner*—Emanuel Todd Voeltz
*Assistant Examiner*—Vuthe Siek
*Attorney, Agent, or Firm*—Burns, Doane, Swecker & Mathis

[57] ABSTRACT

An emulation system contains reorganized instruction code sequences for a computer, so that the native code which is used to emulate instructions that occur most frequently in a typical environment are grouped together, to thereby minimize instruction cache conflicts. A representative set of programs which operate with the emulated code are run, and statistics are recorded to determine the most frequently occurring emulated instructions. The native code which emulates these most frequently occurring instructions is then arranged so that the portions of the code are statically stored in main memory at consecutive memory locations. As a result, when the native code for a frequently occurring emulated instruction is loaded from the memory into the cache, the likelihood that the cache will contain the native code for subsequent emulated instructions is maximized, and the likelihood of cache conflicts is minimized.

8 Claims, 2 Drawing Sheets

METHOD AND SYSTEM FOR INCREASING CACHE EFFICIENCY DURING EMULATION THROUGH OPERATION CODE ORGANIZATION

This application is a continuation of application Ser. No. 08/406,434, filed Mar. 20,1995 now abandoned.

FIELD OF THE INVENTION

The present invention is directed to emulation systems which execute software instructions designed for a specific instruction set on a processor which supports a different instruction set, and more particularly to the efficient use of a memory cache in such emulation systems.

BACKGROUND OF THE INVENTION

Many computers contain cache memories to reduce the time required for their central processing units (CPUs) to obtain data and instructions stored in the main memory of the computer. In a typical computer, the memory device which comprises the main memory for the computer, such as a dynamic random access memory (DRAM), operates at a much slower speed than the computer's CPU. As a result, overall system performance is degraded if the CPU must wait for a slower memory system to access data. One common approach for reducing performance degradation, and more particularly for reducing the latency associated with data access from a slow memory, is to utilize a cache system. In essence, a cache system comprises a high-speed buffer located between the CPU and the main memory. The cache memory is usually embodied in a static random access memory (SRAM), and is used to store copies of selected main-memory data. Each entry in the cache memory consists of the stored data and an address tag, which identifies the physical address of the data in the main memory.

In operation, when the CPU initiates a memory access, the physical or virtual address of the desired information is sent to the cache system. The cache system compares the address with its stored address tags to see if it holds a copy of the data. If the cache memory is storing the given data, the cache reads the data from its own high-speed RAM and delivers it to the CPU. This operation is referred to as a cache hit, and is much faster than reading the same data directly from the main memory. If the cache memory does not hold the requested data, a cache miss is said to occur, in which case the cache system passes the address to the main memory to read the data. When the data is retrieved from the main memory, it is provided to the CPU for processing. The same data is provided to the cache system, which stores it with the appropriate address tag. Computers employ different mapping approaches, based on the physical or virtual address of the data in the main memory, to determine which cache locations to use for the data. For example, a direct-mapped cache uses the lowest order bits of the address for indexing into the cache memory.

Typically, when a cache miss occurs, the cache system does not retrieve and store only the particular data that was requested by the CPU. Rather, while the CPU executes a retrieved instruction or processes retrieved data, the cache reads additional data from adjacent main-memory locations, and also stores them with their address tags in its high-speed memory. This operation is carried out because programs tend to execute instructions and access data in sequences which are typically stored in adjacent memory locations. Thus, when a CPU requests an instruction or data from one memory location, there is a high probability that its next memory access will be at a nearby memory location. By storing a contiguous block of data from neighboring memory locations, there is a good likelihood that the next piece of data requested by the CPU will already be present in the cache memory. Consequently, overall system performance is enhanced. The smallest block of information that is transferred between the main memory and the cache memory in this type of operation is commonly known as a cache line.

In a typical computer architecture, the size of the cache memory is much smaller than that of the main memory. As a result, the information stored in the cache is only a small portion of the total amount of data stored in the main memory. If the CPU addresses a memory location that is outside of a cache line stored in the cache, a cache miss will occur. In this case, a new cache line will be retrieved and written into the cache, which will cause a previously stored cache line to be displaced from the cache. If two frequently used pieces of information are stored in memory locations that are mapped to the same cache location, they will consistently force one another out of the cache. This situation is referred to as a cache conflict, and slows down system performance, because the CPU is continually accessing the main memory, rather than the cache system.

In an emulation system in which software targeted for a specific processor instruction set is run on a processor which supports a different instruction set, efficient use of the cache becomes particularly significant in terms of overall system performance. This is due to the fact that an emulation system must perform a greater number of operations to carry out a given task when it is emulating the software code designed for a different processor than when it is running programs designed for its own instruction set, i.e., native code. More particularly, when a program that is designed to operate with the emulated instruction set issues a command, that command is forwarded to a dispatcher, which then causes a corresponding sequence of instructions in the native code to be executed. The dispatching of the emulated instructions to the native code results in extra processing steps that slow down system performance. If the native code which carries out the emulated instruction is present in the computer's cache memory, the total time required to perform the emulated operation is significantly reduced, relative to the latency which occurs when the native code instruction is not present in the cache. In other words, satisfactory performance of an emulation system relies heavily upon efficient use of the cache memory, and particularly the avoidance of cache conflicts.

Typically, each cache line contains instruction or data items from several adjacent elements in main memory. Thus, when the CPU addresses a particular entry in the main memory, a number of entries sufficient to fill a cache line will be transferred to the cache memory along with the addressed entry. It may be the case, however, that some of these additional entries are never accessed by the CPU. In this situation, the cache system is not being efficiently utilized, since some of its storage area is occupied by entries that are not needed by the CPU. This condition is known as cache fragmentation. In an emulation system it is particularly desirable to minimize cache fragmentation, so that more of the cache memory is available for the instructions that are executed during emulation.

Accordingly, it is desirable to provide an emulation system in which the portion of the native software code for emulating the instruction set of a different processor is most likely to be resident in the computer's cache memory, to thereby enhance the overall emulation process.

SUMMARY OF THE INVENTION

In accordance with the present invention, this objective is achieved in an emulation system by statically reorganizing code sequences for the computer so that the native code which is used to emulate instructions that occur most frequently in a typical environment are grouped together, to thereby minimize instruction cache conflicts and cache fragmentation. To accomplish such an arrangement, a representative set of programs, designed to run on the emulated system, are launched and operated to present common uses of the emulator. Statistics are recorded during the operation of the programs to determine the most frequently occurring emulated instructions. The sequences of instructions in the native code which emulate the most frequently used emulated instructions are then stored in consecutive memory locations. As a result, when the native code for a frequently occurring emulated instruction is loaded from the main memory into the cache memory, the likelihood that the cache will contain the native code for subsequent emulated instructions is maximized, and the likelihood of cache conflicts and cache fragmentation is thereby minimized.

Further features of the invention, and the advantages obtained thereby, are explained in greater detail hereinafter with reference to the illustrated embodiments.

DETAILED DESCRIPTION

To facilitate an understanding of the present invention, it is described hereinafter with reference to its implementation in specific embodiments. In particular, the features of the invention are described in the context of an emulator system in which the instruction set of a processor designed for complex instruction set computing (CISC) is emulated by a processor which is designed for reduced instruction set computing (RISC). In this context, the instruction set for the CISC processor is identified as the "emulated code", and the instruction set for the RISC processor is labeled the "native code". It will be appreciated, however, that the practical applications of the invention are not limited to this particular embodiment. Rather, the invention will find utility in any emulator system which employs a cache memory to enhance system performance.

The central processing unit of a computer is designed to operate with a particular set of software instructions, which form the basis for the computer's operating system. Similarly, most application programs are designed to work with specific operating systems. In the past, for example, many computers were designed to operate with a complex instruction set, and are identified as CISC processors. An example of a CISC processor is the Motorola 68000 series of microprocessors. More recently, there has been a move towards reduced instruction set computing, so-called RISC. An example of a RISC processor is the Motorola 600 Power PC series of microprocessors. Application programs which are designed for a CISC-based processor will not normally run on a RISC-based processor. In order to utilize these application programs on a RISC processor, it is necessary for the RISC processor to emulate the operation of the CISC processor.

Figure 1:
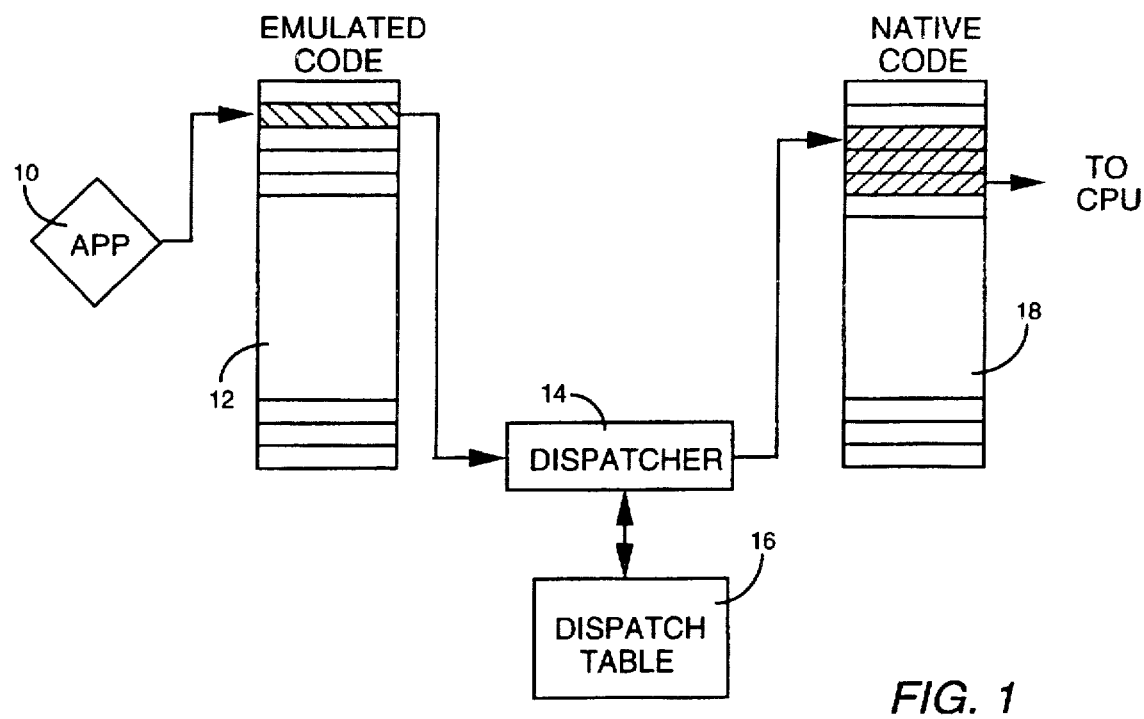
FIG. 1 is a block diagram of the software components of an emulator system.

The basic operations that are carried out in during the emulation process are illustrated in the block diagram of FIG. 1. The blocks in this diagram represent different items of software that are stored in the memory of the computer which is functioning as an emulator. Referring thereto, an application program 10 consists of commands that are designed for the instruction set of the emulated processor, in this case the CISC processor. In FIG. 1, the complete set of instructions for the emulated processor are represented by a list 12. In practice, the application program issues individual instructions for execution by the computer's CPU. For example, the instructions might be issued in response to user inputs. An issued instruction to be emulated by the processor is forwarded to a dispatcher 14. Associated with the dispatcher is a dispatch table 16, which contains pointers to sequences of instructions in the native code 18 that functionally correspond to each of the emulated code instructions. In response to information obtained from the dispatch table, the dispatcher 14 calls one or more corresponding instructions in the native code. The processor, in this case the RISC processor, executes the called instruction(s), and thereby emulates the operation of the CISC processor. In the particular example illustrated in FIG. 1, a single instruction issued by the application program 10 results in the execution of a sequence of three consecutive instructions in the native code (represented by the shaded areas).

Figure 2:
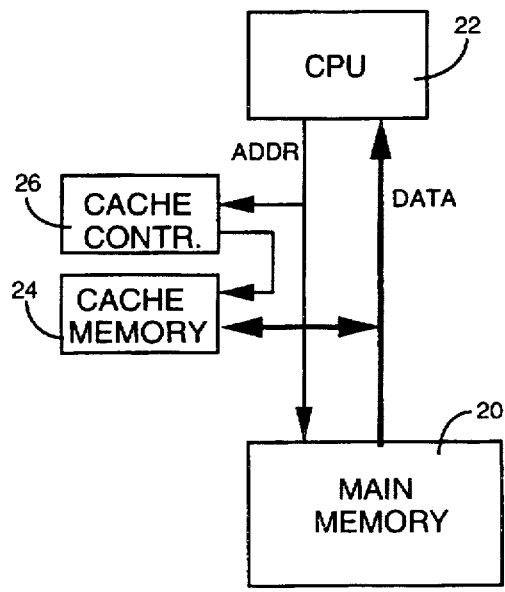
FIG. 2 is an architectural block diagram of a computer that includes a cache system.

It can be seen that the flow of operations depicted in FIG. 1 presents an inherent delay between the time that the emulated instruction is executed by the application program 10 and the time that the native code instruction is retrieved and executed by the CPU. To minimize the length of this delay, it is desirable to store the native code instructions that carry out the emulation process in a cache memory. The general architecture of a computer which contains a cache system is illustrated in FIG. 2. Referring thereto, the software that is currently running on the computer is loaded into its main memory 20, and is accessed by the computer's central processing unit 22. Because the main memory needs to be of a relatively large size, it is typically comprised of a lower cost, and hence slower, memory device, such as a dynamic random access memory (DRAM). Generally, the CPU operates at a much faster speed than such a memory device. As a result, the overall performance of the computer system is degraded if there is significant latency while the CPU waits for instructions and data to be retrieved from the memory. To reduce this latency, therefore, a higher speed cache memory 24 is commonly employed. In the block diagram of FIG. 2, the cache memory is illustrated as a structure that is separate from both the CPU and the main memory. In practice, the cache memory can actually be embodied on the same chip as the CPU, to provide the fastest possible type of access. Alternatively, the cache memory can be a separate device, typically a high-speed static random access memory (SRAM). As a third embodiment, a multi-level cache can be employed, in which a high level cache is physically located on the same chip as the CPU, and a lower level cache is embodied in a separate device.

In operation, when the CPU 22 initiates an access to information stored in the memory, it sends a physical or virtual address associated with the desired information to a cache controller 26. The controller compares this address with address tags stored in the cache memory 24, to see if that information is already stored in the cache. If so, the information is read from the cache memory and delivered to the CPU. If the cache memory does not hold the requested data, the cache controller 26 passes the address to the main memory 20. The information is then retrieved from the main memory and provided to the CPU 22.

Figures 3, 4:
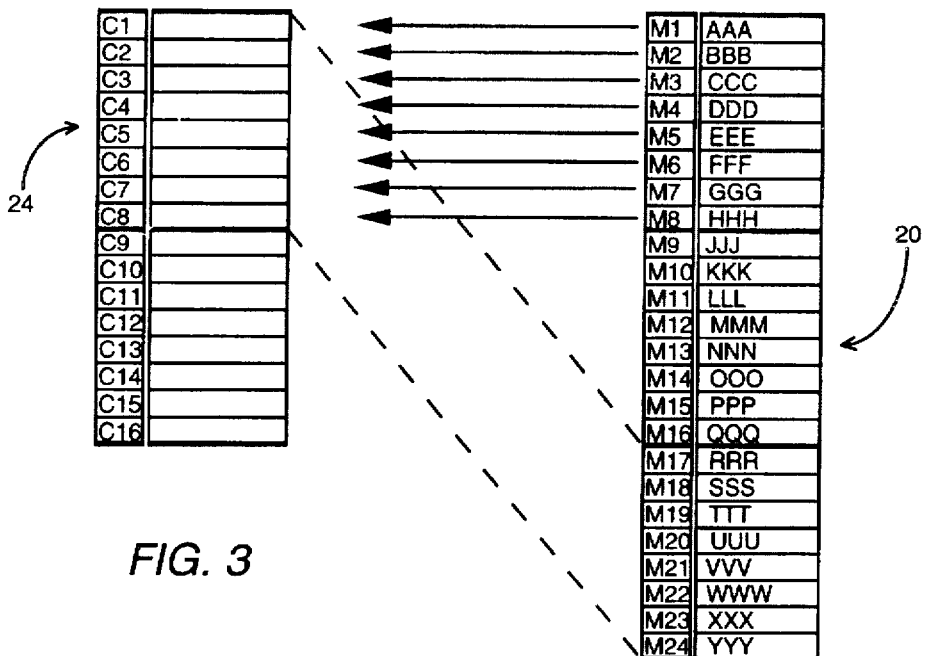
FIG. 3 is a block diagram showing the relationship of information stored in a cache memory and main memory, prior to implementation of the invention.
FIG. 4 is a block diagram of the arrangement of the native code in main memory after implementation of the invention.

At the same time that it is being provided to the CPU, the retrieved information is also forwarded to the cache memory, to be stored therein. While the CPU is processing the retrieved information, the cache system reads additional information from adjacent memory locations in the main memory 20 and stores them. This operation is depicted in FIG. 3. In the particular example illustrated therein, the cache memory 24 is depicted as having a capacity for storing sixteen elements of information which are divided into two lines of eight elements each. The first line occupies memory locations C1–C8, and the second line is stored at addresses C9–C16. The main memory has a capacity for 32 elements, i.e. four lines, of information. In actual practice, of course, typical cache memories and main memories hold significantly greater amounts of information.

Typically, each instruction in an instruction set has a numerical value associated with it, known as its operation code, or op-code. Generally, the native code which emulates instructions is stored in main memory in the op-code order of the emulated instructions, as represented in FIG. 3 by the sequential lettering of the instructions in the memory locations M1–M32.

In operation, the CPU may desire to access the information stored at address M1 of the main memory, i.e. the first instruction in the set. If this instruction is not already present in the cache memory, it is retrieved from the main memory and provided to the CPU. At the same time, this same instruction is loaded into the cache memory. The particular location at which the instruction is stored in the cache will depend upon the mapping technique that is employed for mapping between the main memory and he cache memory. In a direct-mapped cache, for example, the lowest order n bits of the main-memory address (either physical or virtual) determines the cache address for the memory. In the example of FIG. 3, the information stored at address M1 in the main-memory is indexed to address C1 in the cache memory.

Typically, individual elements of information are not stored in the cache. Rather, when a particular address in the main memory is accessed by the CPU, a complete line of information, which includes the information stored at the particular address of interest, is loaded into the cache. In the example of FIG. 3, the line of information stored at addresses M1–M8 of the main memory will be loaded in the cache memory at addresses C1–C8, as represented by the solid arrows even though the CPU only read the single instruction at address M1. This operation of storing a complete line of data in the cache memory is desirable, due to the fact that software programs tend to execute instructions and access data in sequence, which are typically stored in adjacent memory locations. More particularly, if the CPU requests an instruction from address location M1, there is a good probability that the next instruction that it requests will be stored at address location M2, or another nearby memory location. Thus, by storing a full line of data from neighboring memory locations in the cache, the chances are increased that a cache hit will occur upon the next memory access by the CPU.

Eventually, the CPU will request information that is stored outside of the line that has been loaded into the cache memory. For example, the CPU may request the information stored at address M17. In this case, a cache miss will occur, and the information will be provided to the CPU from the main memory 20. When this occurs, a new line of data is stored in the cache. In this case, that line of data may comprise the information stored at address locations M17–M24. This new line of information is also mapped to cache addresses C1–C8, and therefore displaces the data that was previously stored in the cache memory at those addresses, as depicted by the dotted lines.

If the information stored at address locations M1 and M17 are both frequently used instructions or items of data, it can be appreciated that cache misses will regularly occur each time one is accessed after the other, thereby degrading system performance. This degradation is particularly noticeable in an emulation system, due to the increased number of steps that are required each time an emulated instruction is executed. In accordance with the present invention, the performance degradation due to cache misses during emulation is minimized by reorganizing the instructions in the native code so that the most frequently used instructions are stored at neighboring locations within the main memory. As a result, when one of the frequently used instructions is accessed by the CPU, and stored in the cache, the other frequently used instructions will also be stored in the cache at the same time. Thus, while an emulation process is being carried out, the number of cache hits is maximized, thereby improving system performance. Furthermore, cache fragmentation is less likely, since each entry in a line will be occupied by instructions that are normally accessed.

A preferred ordering for the native instruction code is empirically determined by emulating a representative set of programs. More particularly, once the instruction set for an emulator has been established, a representative set of programs that are designed to work with the emulated processor are run, and benchmark tests are employed to count the number of times that each native code instruction is called during a typical emulation. The specific benchmarks that are employed can be based on usage criteria. For example, operations associated with the user interface are employed frequently while a program is running. These operations may include such actions as opening folders or directories to view their contents, moving a document from one folder to another, launching applications, and the like. During the benchmark testing, a counter can be established for each instruction in the native code. When an instruction is called during the emulation procedure, its associated counter is incremented, to thereby develop a histogram which identifies the most frequently used instructions. Any other procedure for developing such a histogram can be employed as an alternative.

After these benchmark tests have been performed with respect to a representative set of programs, the recorded statistical data, e.g. the contents of the counters, will identify the sequences of instructions in the native code instruction set that are most frequently used during emulation. These instructions are then grouped together in the main memory, so that when one of them is called during an emulation, they will all be loaded as a block in the cache. For example, with reference to FIG. 4, if the instructions originally stored at address locations M1 and M17 are the two most frequently called instructions, they can be statically stored at successive locations in the main memory, for example at addresses M1 and M2. Address locations M3 and following contain the next most frequently called instructions in the emulation code. By organizing the native code for emulated instructions in this manner, the likelihood of cache conflicts during emulation is significantly reduced.

It is to be noted that, in the specific example illustrated in FIGS. 3 and 4, individual entries in the memory, i.e. individual instructions, have been reordered. In practice, each instruction in the emulated code may be dispatched to a sequence of multiple instructions in the native code. When the native code is organized for storage in the memory, therefore, the ordering should be in accordance with the frequency with which sequences of instructions are called. In other words, each of the entries AAA, BBB, etc. in FIGS. 3 and 4 can represent sequences of instructions, rather than individual instructions.

In the preferred implementation of the invention, the number of instructions that are grouped should be enough to fill the full size of the cache memory. In the example of FIGS. 3 and 4, therefore, the sixteen most frequently called instructions are stored at address locations M1–M16. Beyond this number, the advantages of grouping instructions is diminished, since cache conflicts are likely to occur in any event.

From the foregoing, therefore, it can be seen that the present invention provides a technique for storing native code instructions in a manner that enhances the probability that the most frequently used emulation instructions will reside in cache memory, and thereby increase the overall performance of the emulator system. It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced therein.

We claim:

1. In a computer having a processor which executes instructions in a first instruction set, a main memory, a cache memory, and an emulation program for emulating the operation of a processor which executes instructions from a second, different instruction set, a method for increasing the efficiency of operation of the computer while said emulation program is running, comprising the steps of:

running an emulated program on said computer which is designed to operate with said second instruction set, and executing commands issued by said emulated program through said emulation program;

identifying the instructions from said first instruction set which are executed the most number of times when said emulated program is running;

storing said identified instructions in said main memory at neighboring address locations that are sufficiently close to one another; and loading said identified instructions into the cache memory such that a predetermined number of said identified instructions are simultaneously stored in the cache memory, wherein said predetermined number is equal to the smallest number of entries that are transferred from the main memory to the cache memory at one time.

2. The method of claim 1 wherein the number of identified instructions which are stored at neighboring address locations is approximately equal to the storage capacity of said cache memory.

3. A computer system comprising:

a processor which executes instructions in a first instruction set;

a cache memory having a predetermined number of address locations; and a main memory having stored therein:

a) said instructions from said first instruction set, and b) an emulation program which receives instructions designed for a second instruction set different from said first instruction set and calls instructions from said first instruction set when an emulated program is executed, the instructions from said first instruction set that are called most frequently by said emulation program are stored in said main memory at address locations which are separated from one another by a distance which is no greater than said predetermined number.

4. The computer system of claim 3 wherein said most frequently called instructions are stored in said main memory at sequential address locations.

5. The computer system of claim 3, wherein said predetermined number is equal to the smallest number of entries that are transferred from the main memory to the cache memory at one time.

6. In a computer having a processor which executes instructions in a first instruction set, a main memory in which data is stored, a cache memory into which data from said main memory is loaded in blocks of contiguous data, and an emulation program for emulating the operation of a processor which executes instructions from a second, different set, a method for increasing the efficiency of operation of the computer while said emulation program is running, comprising the steps of:

running an emulated program on said computer which is designed to operate with said second instruction set, and executing commands issued by said program through said emulation program;

identifying the instructions from said first instruction set which are called the most number of times when said emulated program is running; and storing said identified instructions in said main memory as a contiguous block of data such that the loading of one of said identified instructions into the cache memory causes the entire block of said identified instructions to be stored in the cache memory, wherein the size of said block is at least equal to one line of information that is stored in the cache at a time.

7. In a computer having a processor which executes instructions in a first instruction set, a main memory, a cache memory into which data stored in said main memory is loaded, and an emulation program for emulating the operation of a processor which executes instructions from a second, different instruction set, a method for increasing the efficiency of operation of the computer while said emulation program is running, comprising the steps of:

running an emulated program on said computer which is designed to operate with said second instruction set, and executing commands issued by said emulated program through said emulation program;

identifying a group of instructions from said first instruction set which are the most frequently called instructions when said emulated program is running;

accessing said main memory from said computer's processor to retrieve one of the instructions in said group; and loading all of the identified instructions in said group into the cache memory in response to said access, wherein the size of said group is at least equal to one line of information that is stored in the cache at a time.

8. A method for emulating instructions of an emulated program comprising the steps of:

storing a number of most frequently executed instructions that correspond to instructions being emulated by an emulation program in consecutive address locations of said main memory, wherein the address space of said consecutive address locations corresponds to at least one cache line of said cache memory; and executing a command issued by said emulation program that loads into said cache memory a most frequently executed instruction that is stored at a first address location of said consecutive address locations, thereby loading an entire cache line of said most frequently executed instructions into the cache memory.

* * * * *